(12) United States Patent
Lueneburg et al.

(10) Patent No.: US 12,149,193 B1
(45) Date of Patent: Nov. 19, 2024

(54) CENTRALIZED INVERTER ARCHITECTURE

(71) Applicant: Amazon Technologies, Inc., Seattle, WA (US)

(72) Inventors: Andrew Lueneburg, Seattle, WA (US); Xiaoqi Wang, Bellevue, WA (US); Tausif Husain, Maple Valley, WA (US); Frederic Pierre Lacaux, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 239 days.

(21) Appl. No.: 17/934,108

(22) Filed: Sep. 21, 2022

(51) Int. Cl.
*H02P 27/06* (2006.01)
*B60L 50/51* (2019.01)
*B64D 27/24* (2024.01)
*B64U 50/19* (2023.01)

(52) U.S. Cl.
CPC .............. *H02P 27/06* (2013.01); *B64D 27/24* (2013.01); *B60L 50/51* (2019.02); *B60L 2200/10* (2013.01); *B64D 2221/00* (2013.01); *B64U 50/19* (2023.01)

(58) Field of Classification Search
None
See application file for complete search history.

(56) References Cited

U.S. PATENT DOCUMENTS

| | | | |
|---|---|---|---|
| 11,128,251 B1 | 9/2021 | Solodovnik et al. | |
| 11,271,515 B2 | 3/2022 | Kimura et al. | |
| 2010/0140415 A1 | 6/2010 | Goossen | |
| 2012/0182024 A1 | 7/2012 | Ike et al. | |
| 2014/0300180 A1 | 10/2014 | Iwashita et al. | |
| 2016/0236790 A1* | 8/2016 | Knapp | B64C 11/44 |
| 2017/0246959 A1 | 8/2017 | Loftus et al. | |
| 2019/0334468 A1* | 10/2019 | Stauffer | F04D 25/08 |

* cited by examiner

*Primary Examiner* — Jared Fureman
*Assistant Examiner* — Aqeel H Bukhari
(74) *Attorney, Agent, or Firm* — Athorus, PLLC (57) ABSTRACT

Described are systems and methods for providing a centralized inverter architecture that incorporates multiple inverters co-located in a single integrated power core. Exemplary embodiments of the present disclosure can provide an exemplary power electronics system that includes integrated power core units having multiple inverters co-located in a centralized location. The integrated power cores can enable compute topologies that enable communication between the inverters and coordinated operation of the inverters. The integrated power cores can also be configured as a single line replaceable unit (LRU) to facilitate efficient repair, maintenance, and/or replacement of each integrated power core.

20 Claims, 7 Drawing Sheets

CENTRALIZED INVERTER ARCHITECTURE

BACKGROUND

Electric motors are widely used in various systems and devices. For example, systems and devices, such as refrigerators, washers/dryers, air conditioners, fans, automobiles, aerial vehicles, and the like, all rely on electric motors to convert electrical energy to mechanical energy. Typically, electric motors are driven and/or controlled by power electronics, which may be configured to supply power to the electric motors from a power supply to achieve the desired operation and/or performance of the electric motors. In certain applications, the power electronics driving and/or controlling an electric motor may include one or more inverters, which can be configured to facilitate operation of the electric motors at the desired speed, torque, and the like. Traditionally, the inverters driving the motors are typically co-located with the corresponding motors they are driving as an integrated unit. Although co-locating the inverters with the motors can provide benefits by reducing various alternating current (AC) components and circuitry, it can expose the inverters to harsh environmental conditions (e.g., heat, vibration, etc.). Exposure to such environmental conditions can require environmental protection components for cooling and the like, which can introduce additional weight and complexities to the power electronics.

DETAILED DESCRIPTION

As is set forth in greater detail below, exemplary embodiments of the present disclosure are generally directed to systems and methods for providing a centralized inverter architecture for driving and/or controlling electric motors. Accordingly, exemplary embodiments of the present disclosure can provide a centralized inverter architecture that includes multiple inverters co-located in a centralized location (e.g., in a fuselage of an aerial vehicle) relative to the motors being driven and/or controlled by the multiple inverters. The co-located inverters may be implemented as an integrated power core unit, which can be configured as a single line replaceable unit (LRU) to facilitate efficient repair, maintenance, and/or replacement of each integrated power core. Further, configuring the inverters in a centralized co-location as integrated power cores can facilitate various improvements over traditional power electronics architectures, such as, for example, reduced complexities, reductions in the size, weight, and/or number of certain components, enabling a centralized low-voltage network, enabling certain compute topology, which can facilitate communication between inverters and/or coordinated operation of the inverter and/or electric motors, and the like. Accordingly, each integrated power core may implement one or more of these various improvements and may include one or more centralized controllers, one or more DC-to-DC converters, various protection and/or isolation mechanisms, a controller area network (CAN) bus connection, and the like.

In an exemplary implementation of the present disclosure, a power electronics architecture having one or more co-located integrated power cores may be employed. The integrated power cores may be electrically coupled to a power supply (e.g., one or more battery strings, etc.) via a high voltage direct current (DC) bus. Further, each integrated power core may include multiple co-located inverters configured to drive and/or control multiple corresponding electric motors. According to certain aspects of the present disclosure, the integrated power cores (and their respective inverters) may be centrally located and remote relative to the corresponding electric motors that they are configured to drive and/or control. The centralized co-location of the inverters of the integrated power cores can facilitate certain compute topologies and provisioning of a low voltage network to power low voltage loads. Accordingly, the integrated power cores may include one or more centralized controllers and one or more step-down DC-to-DC converters to regulate the voltage from the high voltage DC bus to the low voltage network. Further, the integrated power cores may include protection and/or isolation devices (e.g., switches, fuses, circuit breakers, etc.) configured to isolate each inverter included in the integrated power cores in the event of a fault and/or failure condition.

According to exemplary embodiments of the present disclosure, the exemplary power electronics architecture may be implemented in an aerial vehicle, such as an unmanned aerial vehicle (UAV). In such an exemplary implementation, the inverters, configured to drive and/or control propulsion mechanisms of the UAV, may be co-located as part of one or more integrated power cores, which may be electrically coupled to one or more power supplies via a high voltage DC bus. The integrated power cores may be centrally located in a fuselage of the UAV and physically separated from the propulsion mechanisms that the inverters may be driving and/or controlling so that environmental conditions experienced at the propulsion mechanism, e.g., vibration, heat, etc., are not experienced by the inverters. Further, each integrated power core may include a DC-to-DC converter configured to step down the voltage from the high voltage DC bus to power low voltage loads, such as avionics systems (e.g., navigation systems, communication systems, etc.), sensors, and other low voltage electrical components of the UAV. Further, each integrated power core can facilitate a centralized and/or on-board compute topology, which can be configured to facilitate communication between inverters and/or coordinate the operation, performance, protections, diagnostics, etc. of the inverters and/or propulsion mechanisms.

Advantageously, co-locating the inverters in a centralized location can provide certain benefits over traditional and existing power electronics architectures. For example, the size and/or weight of the DC capacitors associated with the inverters can be significantly reduced, which can provide significant weight savings. For example, the centralized co-location of the inverters (and power cores) can facilitate reduction in parasitic losses associated with DC power distribution and coordinated operation (e.g., interleaved control, load sharing, etc.) of the inverters and/or electric motors driven and/or controlled by the inverters via a centralized compute topology, which can both allow for reductions in the required DC link capacitances. For example, coordinated phase offsets can be applied to the switching patterns across inverter channels, thereby reducing the DC current and voltage ripples on the DC link capacitors, thereby reducing the size and weight of the DC link capacitors. Further, co-locating the inverters can facilitate sharing of components (e.g., heat shields and/or heat sinks, etc.) based on optimized load distribution, which can further provide further weight savings. As the integrated power cores may be the primary point of connection to the power supply, the centralized co-location of the inverters (and power cores) can obviate the need for a power distribution module (PDM) when compared to traditional power electronics configurations. The weight saving benefits can be of particular significance in aerospace applications with respect to range, efficiency, and the like. Further, although the exemplary embodiments of the present disclosure are primarily described with respect to power electronics systems implemented in an aerial vehicle, exemplary embodiments of the present disclosure may be relevant to other applications and implementations.

Figure 1:
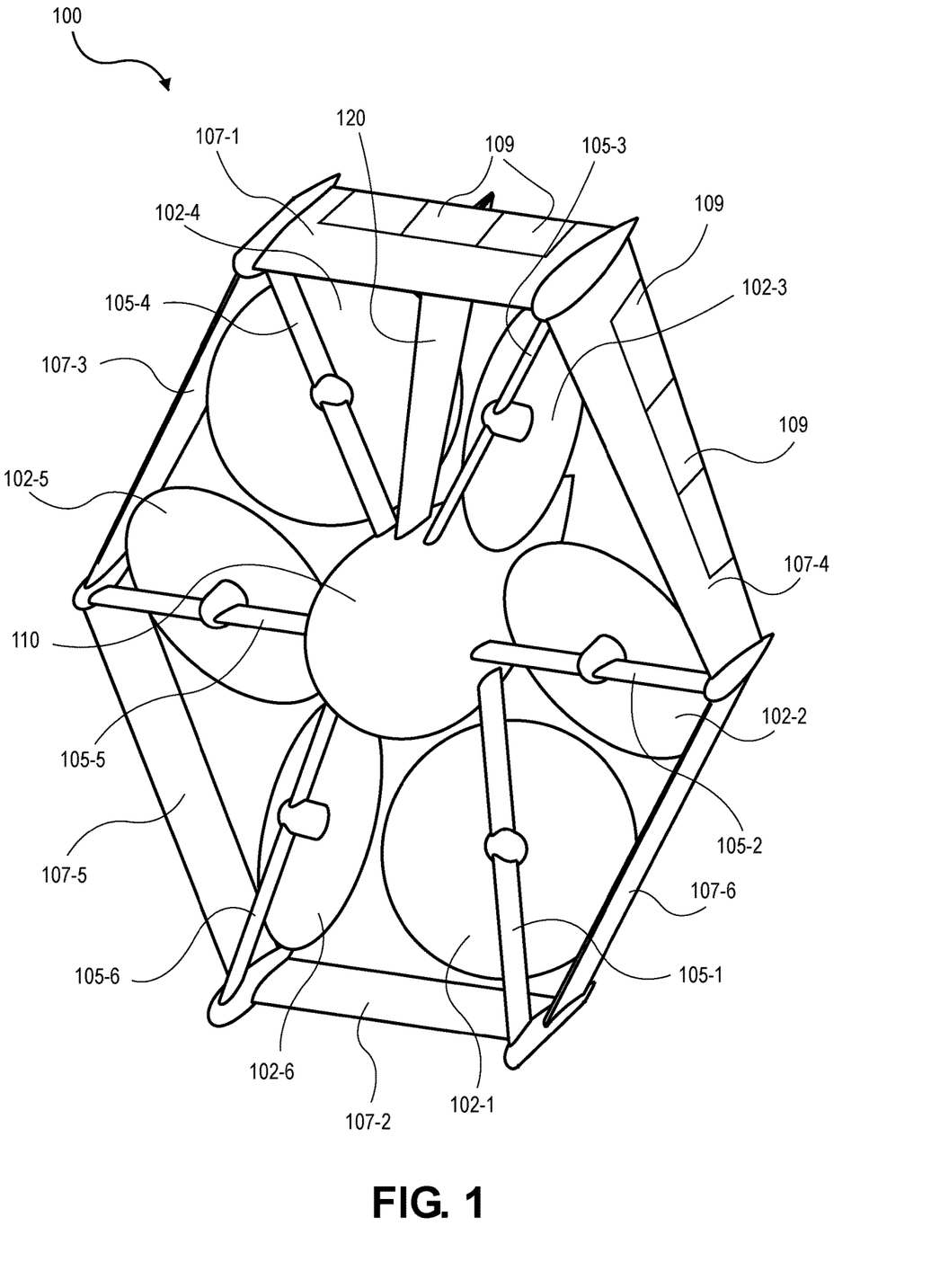
FIG. 1 illustrates an exemplary unmanned aerial vehicle, according to exemplary embodiments of the present disclosure.

FIG. 1 illustrates an exemplary unmanned aerial vehicle 100, according to exemplary embodiments of the present disclosure.

As shown in FIG. 1, aerial vehicle 100 may include a ring wing that is substantially hexagonal in shape and that surrounds a plurality of propulsion mechanisms. Aerial vehicle 100 may include six propulsion mechanisms 102-1, 102-2, 102-3, 102-4, 102-5, and 102-6 spaced about fuselage 110 of aerial vehicle 100. Although aerial vehicle 100 is shown with six propulsion mechanisms 102, aerial vehicle 100 may include any number of propulsion mechanisms 102. Propulsion mechanisms 102 may include electric motors, propellers, or any other form of propulsion and may each be controlled by respective power electronics/motor drive units, such as inverters, electronic speed controllers (ESCs), electronic torque controllers, and the like. Further, one or more of propulsion mechanisms 102 of aerial vehicle 100 may utilize fans, jets, turbojets, turbo fans, jet engines, and/or the like to maneuver the aerial vehicle. Generally described, propulsion mechanism 102, as used herein, can include any form of propulsion mechanism that is capable of generating a force sufficient to maneuver aerial vehicle 100, alone and/or in combination with other propulsion mechanisms. Furthermore, in certain implementations, propulsion mechanisms 102 may be configured such that their individual orientations may be dynamically modified. Likewise, while the examples herein describe the propulsion mechanisms being able to generate force in either direction, in some implementations, the propulsion mechanisms may only generate force in a single direction. However, the orientation of the propulsion mechanism may be adjusted so that the force can be oriented in a positive direction, a negative direction, and/or any other direction.

According to exemplary embodiments of the present disclosure, the power electronics/motor drive units, e.g., inverters, that are configured to drive and/or control propulsion mechanisms 102 may be centrally co-located within fuselage 110 of aerial vehicle 100. For example, the inverters may be physically separated from propulsion mechanisms 102 so that environmental conditions experienced at propulsion mechanisms 102, e.g., vibration, heat, etc., are not experienced by the inverters and may be implemented as part of integrated power cores that are positioned and arranged in fuselage 110.

In the illustrated implementation, aerial vehicle 100 can also include ring wing 107, having a substantially hexagonal shape that extends around and forms the perimeter of aerial vehicle 100. In the illustrated example, ring wing 107 can include six segments 107-1, 107-2, 107-3, 107-4, 107-5, and 107-6 that are joined at adjacent ends to form ring wing 107 around aerial vehicle 100. Each segment of ring wing 107 has an airfoil shape to produce lift when aerial vehicle 100 is oriented and moving in a direction that is substantially horizontal. As illustrated, and discussed further below, the ring wing is positioned at a canted angle with respect to fuselage 110 such that lower segment 107-2 of ring wing 107 acts as a front wing as it is toward the front of the aerial vehicle when oriented as shown and moving in a horizontal direction. Upper segment 107-1 of ring wing 107, which has a longer chord length than lower segment 107-2 of ring wing 107, is positioned, in a horizontal orientation, further back relative to lower segment 107-2, and thus can act as a rear wing.

Ring wing 107 can be secured to fuselage 110 by motor arms 105. In this example, motor arms 105-1, 105-2, 105-3, 105-4, 105-5, and 105-6 are coupled to fuselage 110 at one end and are coupled to ring wing 107 at a second end, thereby securing ring wing 107 to fuselage 110. In other implementations, less than all of motor arms 105 may extend from fuselage 110 and couple to ring wing 107.

In some implementations, aerial vehicle 100 may also include one or more stabilizer fins 120 that extend from fuselage 110 to ring wing 107. Stabilizer fin 120 may also have an airfoil shape. In the illustrated example, stabilizer fin 120 extends vertically from fuselage 110 to ring wing 107. In other implementations, stabilizer fin 120 may be disposed at other positions. For example, stabilizer fin 120 may extend downward from the fuselage between motor arm 105-1 and motor arm 105-6.

As illustrated, propulsion mechanisms 102 may be oriented at different angles with respect to each other. For example, propulsion mechanisms 102-2 and 102-5 can be aligned with fuselage 110, such that the force generated by each of propulsion mechanisms 102-2 and 102-5 is in-line or in the same direction or orientation as the fuselage. In the illustrated example, aerial vehicle 100 is oriented for high-speed, fixed-wing, wing-borne, horizontal flight such that the fuselage is oriented horizontally in the direction of travel. In such an orientation, propulsion mechanisms 102-2 and 102-5 provide horizontal forces, also referred to herein as thrusting forces, and act as thrusting propulsion mechanisms.

In comparison to propulsion mechanisms 102-2 and 102-5, each of propulsion mechanisms 102-1, 102-3, 102-4, and 102-6 are offset or angled with respect to the orientation of fuselage 110. Accordingly, when aerial vehicle 100 is oriented for horizontal flight, propulsion mechanisms 102-1, 102-3, 102-4, and 102-6 may be used to provide thrust in a non-horizontal direction to cause the aerial vehicle to pitch, yaw, roll, heave and/or sway. In other implementations, during horizontal flight, propulsion mechanisms 102-1, 102-3, 102-4, and 102-6 may be disabled such that they do not produce any forces and the aerial vehicle 100 may be propelled aerially in a horizontal direction as a result of the lifting force from the aerodynamic shape of the ring wing 107 and the horizontal thrust produced by propulsion mechanisms 102-2 and 102-5.

The angle of orientation of each of the propulsion mechanisms 102-1, 102-2, 102-3, 102-4, 102-5, and 102-6 may vary for different implementations. Likewise, in some implementations, the offset of the propulsion mechanisms 102-1, 102-2, 102-3, 102-4, 102-5, and 102-6 may each be the same, with some oriented in one direction and some oriented in another direction, may each be oriented different amounts, and/or in different directions. Further, the configuration and arrangement of propulsion mechanisms 102-1, 102-2, 102-3, 102-4, 102-5, and 102-6 may also facilitate load balancing operation of aerial vehicle 100 in the event that one or more of propulsion mechanisms 102-1, 102-2, 102-3, 102-4, 102-5, and 102-6 may be operating in two-phase mode in view of a failure or fault condition associated with the power electronics/motor drive unit and/or ESC associated with propulsion mechanisms 102-1, 102-2, 102-3, 102-4, 102-5, and 102-6.

In the illustrated example of FIG. 1, each propulsion mechanism 102-1, 102-2, 102-3, 102-4, 102-5, and 102-6 may be oriented approximately thirty degrees with respect to the position of each respective motor arm 105-1, 105-2, 105-3, 105-4, 105-5, and 105-6. In addition, the direction of orientation of propulsion mechanisms 102-1, 102-2, 102-3, 102-4, 102-5, and 102-6 is such that pairs of propulsion mechanisms are oriented toward one another. For example, propulsion mechanism 102-1 is oriented approximately thirty degrees toward propulsion mechanism 102-6. Likewise, propulsion mechanism 102-2 is oriented approximately thirty degrees in a second direction about third motor arm 105-2 and oriented toward propulsion mechanism 102-3. Finally, propulsion mechanism 102-4 is oriented approximately thirty degrees in the first direction about fourth motor arm 105-4 and toward propulsion mechanism 102-5. As illustrated, propulsion mechanisms 102-3 and 102-6, which are on opposing sides of fuselage 110, are aligned and oriented in a same first direction (in this example, horizontal). Propulsion mechanisms 102-2 and 102-5, which are on opposing sides of fuselage 110, are aligned and oriented in a same second direction, which is angled compared to the first direction. Propulsion mechanisms 102-1 and 102-4, which are on opposing sides of fuselage 110, are aligned and oriented in a same third direction, which is angled compared to the first direction and the second direction.

Further, fuselage 110 may be sized, dimensioned, and/or configured to house and/or store one or more components of aerial vehicle 100, such as an aerial vehicle control system, an electrical power supply, a power supply (e.g., one or more batteries, etc.), a battery management system (which may be implemented as part of the aerial vehicle control system and/or as a separate and discrete system), one or more integrated power cores, and/or a payload that is transported by aerial vehicle 100. Preferably, the power supply may include one or more batteries and/or battery packs made up of numerous battery cells connected in series. Likewise, in some implementations, the power supply may be removable and replaceable with different second power supplies for different flight durations, different total vehicle weight, replacement, and the like. Further, each integrated power core may form a single line replaceable unit (LRU), which can facilitate efficient repair, maintenance, and/or replacement of each integrated power core.

Figure 2A:
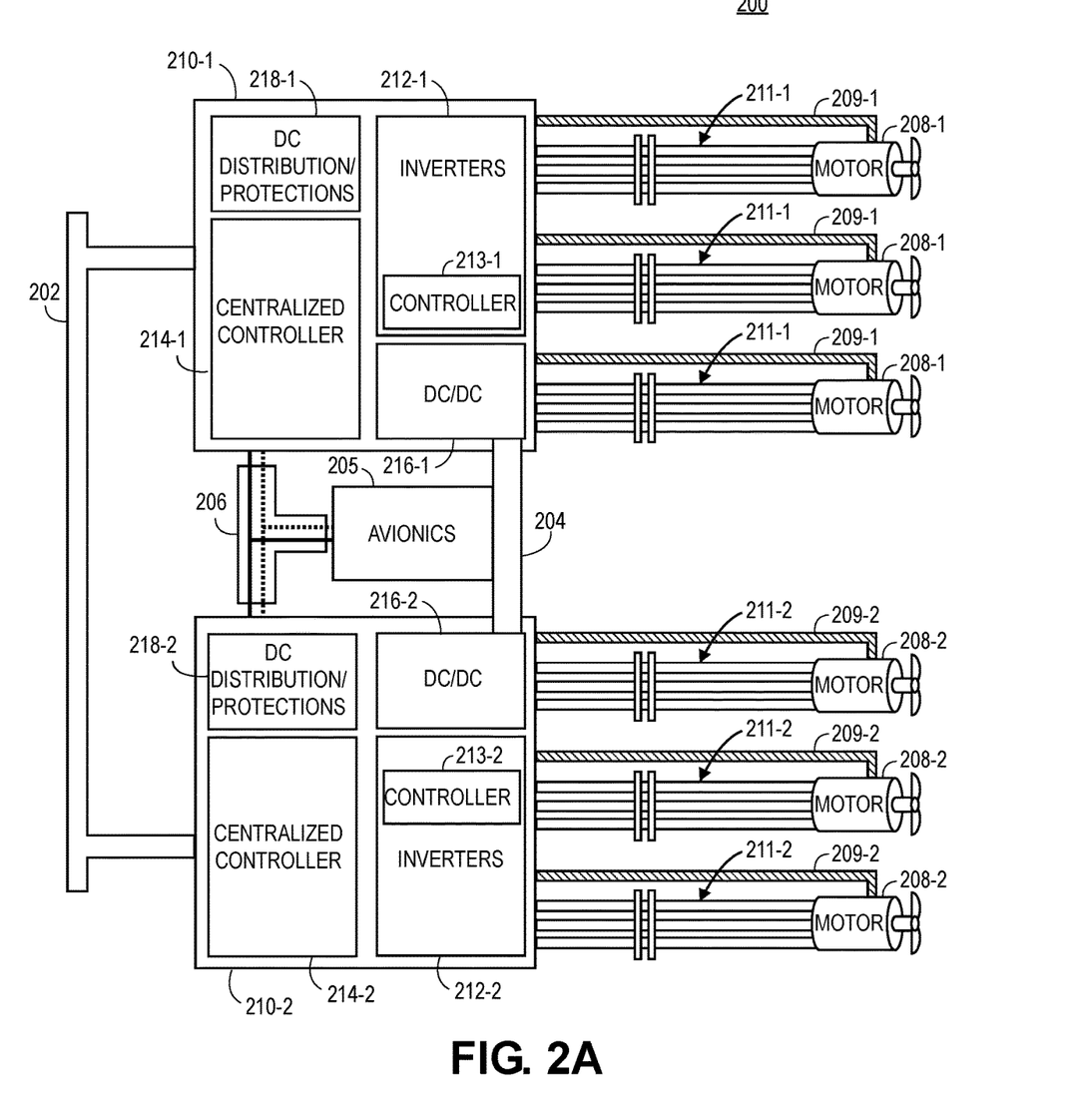
FIG. 2A is a block diagram illustrating a simplified exemplary power electronics system, according to exemplary embodiments of the present disclosure.
Figure 2B:
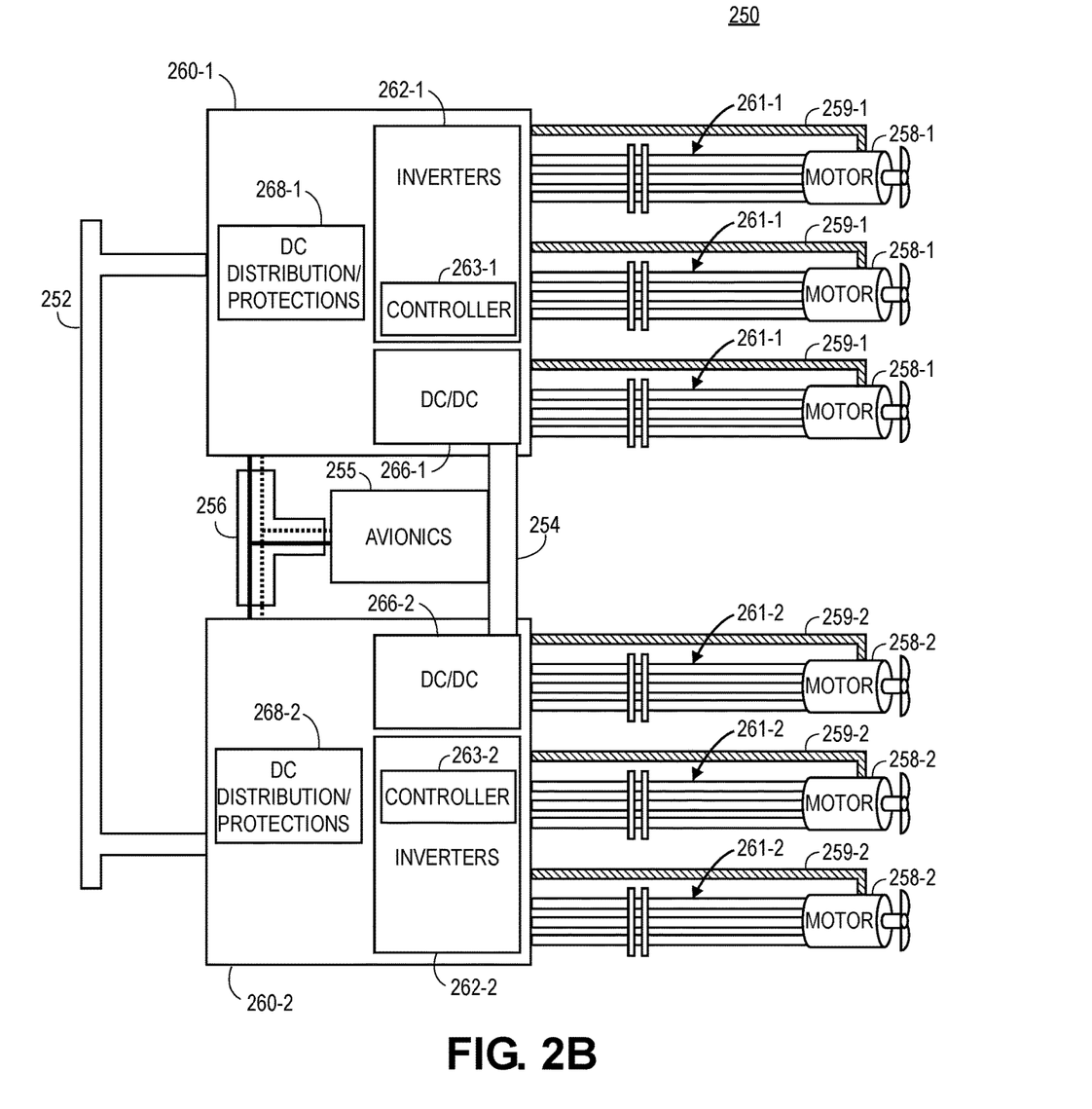
FIG. 2B is a block diagram illustrating a simplified exemplary power electronics system, according to exemplary embodiments of the present disclosure.

FIGS. 2A and 2B are block diagrams illustrating simplified exemplary power electronics systems 200 and 250, according to exemplary embodiments of the present disclosure. Exemplary power electronics systems 200 and 250 illustrated in FIGS. 2A and 2B may illustrate exemplary implementations of exemplary power electronics architectures that may be employed in an aerial vehicle (e.g., aerial vehicle 100), such as a UAV.

As shown in FIG. 2A, power electronics system 200 may include high voltage DC bus 202, low voltage DC bus 204, controller area network (CAN) bus 206, and one or more integrated power cores 210, which may be configured to drive and control motors 208. As illustrated, integrated power cores 210 may be electrically coupled to power supplies (e.g., battery strings, batteries packs, etc.) via one or more connections to high voltage DC bus 202 and may include multiple inverters 212 and centralized controllers 214 that are configured to drive and/or control motors 208. According to certain aspects of the present disclosure, each inverter 212 may include a respective protection device (e.g., fuse, switch, circuit breaker, etc.) that may be configured to isolate each corresponding inverter 212 in the event of a fault and/or failure condition experienced by any of inverters 212. Integrated power cores 210 may also include DC-to-DC converters 216 and DC distribution and/or protection mechanisms 218.

As illustrated in FIG. 2A, inverters 212-1 of integrated power core 210-1 may be configured to drive and/or control motors 208-1 via AC connections 211-1, and each motor 208-1 may include feedback loop 209-1, which may be configured to provide telemetry information (e.g., sensor information, speed information, torque information, temperature information, etc.) associated with the operation of motors 208-1 to inverter controllers 213-1 associated with inverters 212-1. Similarly, inverters 212-2 of integrated power core 210-2 may be configured to drive and/or control motors 208-2 via AC connections 211-2, and each motor 208-2 may include feedback loop 209-2, which may be configured to provide telemetry information (e.g., sensor information, speed information, torque information, temperature information, etc.) associated with the operation of motors 208-2 to inverter controllers 213-2 associated with inverters 212-2. According to an exemplary implementation of the present disclosure, each integrated power core 210 may include three inverters 212. Further, although power electronics system 200 is illustrated with two integrated power cores 210, exemplary embodiments of the present disclosure contemplate a power electronics architecture that can include any number of integrated power cores 210, each including any number of inverters 212 driving any number of motors 208.

As illustrated in FIG. 2A, each integrated power core 210 can include one or more controller area network (CAN) bus 206 connection(s), which can facilitate communication between avionics systems 205 and centralized controllers 214 of integrated power cores 210, as well as inverter controllers 213 of inverters 210. For example, CAN bus 206 can facilitate communications between avionics systems 205 (e.g., flight computers, navigational systems, communication systems, etc.) with centralized controllers 214 of integrated power cores 210 and inverter controllers 213 of inverters 212 in connection with the operation, performance, etc. of motors 208. Further, each integrated power core 210 may also include one or more DC-to-DC converters 216, which may include step-down converters configured to down convert the voltage from high voltage DC bus 202 to suitable voltages to power low voltage DC bus 204, which may power avionics systems 205.

According to exemplary embodiments of the present disclosure, integrated power cores 210 may be centrally co-located (e.g., in a fuselage of an aerial vehicle) while being physically separated/remotely located from motors 208 so that environmental conditions experienced at motors 208, e.g., vibration, heat, etc., are not experienced by inverters 212. The centralized co-location of integrated power cores 210 can provide many benefits. For example, centrally co-locating integrated power cores 210, and their corresponding inverters 212, can significantly reduce the high voltage DC bus (such that it effectively becomes negligible), which enables a reduction in size of the DC capacitors associated with inverters 212, thereby providing weight savings in the components. Additionally, integrated power cores 210 can share thermal management solutions (e.g., heat spreaders, etc.), rather than having individual heat sinks for each inverter 212. The shared thermal management solutions can also be sized and dimensioned in view of average loading of power electronics system 200, rather than in view of a worst-case loading per inverter 212, thereby enabling further weight savings.

Further, centrally co-locating integrated power cores 210, and their corresponding inverters 212, can facilitate power distribution to low voltage DC bus 204 via DC-to-DC converters 216. Accordingly, integrated power cores 210 effectively handle power distribution by power electronics system 200, without the need for a separate power distribution module, which is typically employed in existing systems. This can simplify and provide advantages to power distribution by, for example, reducing the number of connections to high voltage DC bus 202, facilitating the addition of protection and/or isolation devices to low voltage DC bus 204, potentially eliminating ground paths in the low voltage network, which can thereby simplify fault detection mechanisms, and the like. Further, including DC-to-DC converters 216 in integrated power cores 210 provides redundancy to ensure that that low voltage DC bus 204 remains powered in the event of a failure of a single DC-to-DC converter 216 and/or integrated power core 210.

As illustrated in FIG. 2A, integrated power cores 210 may also include DC distribution and/or protection mechanisms 218 (e.g., DC distribution and/or protection mechanisms 218-1 and 218-2). DC distribution and/or protection mechanisms 218 may include components to facilitate power distribution (e.g., via one or more connections) from high voltage DC bus 202 to inverters 212, centralized controllers 214, and/or DC-to-DC converter 216. Additionally, DC distribution and/or protection mechanism 218 may include various protection devices (e.g., switches, circuit breakers, fuses, and the like) that may be configured to isolate certain components of integrated power cores 210 in the event of certain fault and failure conditions (e.g., a line-to-line short circuit condition, a ground fault condition, a power supply short circuit condition, and the like).

Additionally, the centralized co-location of integrated power cores 210, and their corresponding inverters 212, can facilitate certain centralized compute topologies. The centralized compute topologies can facilitate communication between inverters 212 to allow certain coordinated performance and/or operation of the DC link capacitors, inverters 212, and/or motors 208, which can lead to further reductions in the size of the DC capacitors associated with inverters 212, thereby realizing further weight savings. Further, the centralized compute topologies can provide additional redundancies to ensure continued operation in the event of a fault and/or failure condition experienced by a controller. In the exemplary implementation illustrated in FIG. 2A, the centralized compute topology can include centralized controllers 214, which may be implemented as part of integrated power cores 210. Each centralized controller 214 may include one or more controllers, and may be configured to communicate, via CAN bus 206, with avionics systems 205 and inverter controllers 213. According to exemplary embodiments of the present disclosure, centralized controllers 214 may be configured to act as a bridge between avionics systems 205 (e.g., flight controllers, navigation systems, etc.) to process and control management and/or monitoring functions, such as providing flight commands/instructions to inverters 212, DC-to-DC converter monitoring, communications, mode and/or state control, monitoring operation and/or fault conditions associated with inverters 212, and the like. Exemplary implementations of a centralized compute topology that may be employed by power electronics system 200 is described in further detail herein in connection with FIG. 3A.

In the illustrated exemplary implementation, each integrated power core 210 may be electrically coupled, via high voltage DC bus 202, to power supplies of an aerial vehicle, such as a UAV. Each integrated power core 210 may include inverters 212, each having one or more associated inverter controllers 213, one or more centralized controllers 214, and DC-to-DC converters 216, which can power low voltage DC bus 204. In operation, centralized controllers 214 may communicate with inverter controllers 213, as well as avionics systems 205 (e.g., via CAN bus 206), and inverters 212 may be electrically coupled to motors 208 (via AC connections 211), which may be associated with propulsion mechanisms (e.g., propulsion mechanisms 102) of the aerial vehicle, to drive and/or control motors 208 and/or the propulsion mechanisms. Additionally, centralized controllers 214 and/or inverter controllers 213 may be configured to activate certain protection mechanisms in the event of fault and/or failure conditions.

FIG. 2B is a block diagram illustrating exemplary power electronics system 250, which may be substantially similar to power electronics system 200 illustrated in FIG. 2A. However, power electronics system 250 illustrated in FIG. 2B may employ a compute topology that may be different than the compute topology illustrated in FIG. 2A. For example, in the exemplary implementation shown in FIG. 2B, power electronics system 250 may not include centralized controllers 214 as part of integrated power cores 210 in power electronics system 200, as shown in FIG. 2A. Rather, power electronics system 250 includes a ring communication bus configuration that can facilitate direct communication between the inverters.

As shown in FIG. 2B, power electronics system 250 may include high voltage DC bus 252, low voltage DC bus 254, controller area network (CAN) bus 256, and multiple integrated power cores 260, which may be configured to drive and control motors 258. Integrated power cores 260 may be coupled to power supplies (e.g., battery strings, batteries packs, etc.) via high voltage DC bus 252 and may include multiple inverters 262, which may include inverter controllers 263, that are configured to drive and/or control motors 258. As illustrated in FIG. 2B, inverters 262-1 of integrated power core 260-1 may be configured to drive and/or control motors 258-1 via AC connections 261-1, and each motor 258-1 may include feedback loop 259-1, which may be configured to provide telemetry information (e.g., sensor information, speed information, torque information, temperature information, etc.) associated with the operation of motors 258-1 to inverter controllers 263-1 associated with inverters 262-1. Similarly, inverters 262-2 of integrated power core 260-2 may be configured to drive and/or control motors 258-2 via AC connections 261-2, and each motor 258-2 may include feedback loop 259-2, which may be configured to provide telemetry information (e.g., sensor information, speed information, torque information, temperature information, etc.) associated with the operation of motors 258-2 to inverter controllers 263-2 associated with inverters 262-2. According to an exemplary implementation of the present disclosure, each integrated power core 260 may include three inverters 262. Further, although power electronics system 200 is illustrated with two integrated power cores 260, exemplary embodiments of the present disclosure contemplate a power electronics architecture that can include any number of integrated power cores 260, each including any number of inverters 262 driving any number of motors 258. Integrated power cores 260 may also include DC-to-DC converters 266 and DC distribution and/or protection mechanisms 268

As illustrated in FIG. 2B, each integrated power core 260 can include one or more connections to controller area network (CAN) bus 256 connection, which can facilitate communication between avionics systems 255 and inverter controllers 263 of inverters 260. For example, CAN bus 256 can facilitate communications between avionics systems 255, such as, for example, flight computers, navigational systems, communication systems, etc. inverter controllers 263 of inverters 260 in connection with the operation, performance, etc. of motors 258. Further, each integrated power core 260 may also include one or more DC-to-DC converters 266, which may include step-down converters configured to down convert the voltage from high voltage DC bus 252 to suitable voltages to power low voltage DC bus 254, which may power avionics systems 255.

According to exemplary embodiments of the present disclosure, integrated power cores 260 may be centrally co-located (e.g., in a fuselage of an aerial vehicle) while being physically separated/remotely located from motors 258 so that environmental conditions experienced at motors 258, e.g., vibration, heat, etc., are not experienced by inverters 262. The centralized co-location of integrated power cores 260 can provide many benefits. For example, centrally co-locating integrated power cores 260, and their corresponding inverters 262, can significantly reduce the high voltage DC bus (such that it effectively becomes negligible), which enables a reduction in size of the DC capacitor(s) associated with inverters 262, thereby providing weight savings in the components. Additionally, integrated power cores 260 can share thermal management solutions (e.g., heat spreaders, etc.), rather than having individual heat sinks for each inverter 262. The shared thermal management solutions can also be sized and dimensioned in view of average loading of power electronics system 250, rather than in view of a worst-case loading per inverter 262, thereby enabling further weight savings.

Further, centrally co-locating integrated power cores 260, and their corresponding inverters 262, can facilitate power distribution to low voltage DC bus 254 via DC-to-DC converters 266. Accordingly, integrated power cores 260 effectively handle power distribution by power electronics system 250, without the need for a separate power distribution module, which is typically employed in existing systems. This can simplify and provide advantages to power distribution by, for example, reducing the number of connections to high voltage DC bus 252, facilitating the addition of protection and/or isolation devices to low voltage DC bus 254, potentially eliminating ground paths in the low voltage network, which can thereby simplify fault detection mechanisms, and the like. Further, including DC-to-DC converters 266 in integrated power cores 260 provides redundancy to ensure that that low voltage DC bus 254 remains powered in the event of a failure of a single DC-to-DC converter 266 and/or integrated power core 260.

As illustrated in FIG. 2B, integrated power cores 260 may also include DC distribution and/or protection mechanisms 268 (e.g., DC distribution and/or protection mechanisms 268-1 and 268-2). DC distribution and/or protection mechanisms 268 may include components to facilitate power distribution (e.g., via one or more connections) from power from high voltage DC bus 252 to inverters 262 and/or DC-to-DC converter 266. Additionally, DC distribution and/or protection mechanism 268 may include various protection devices (e.g., switches, circuit breakers, fuses, and the like) that may be configured to isolate certain components of integrated power cores 260 in the event of certain fault and failure conditions (e.g., a line-to-line short circuit condition, a ground fault condition, a power supply short circuit condition, a ground fault condition, and the like).

Additionally, the centralized co-location of integrated power cores 260, and their corresponding inverters 262, can facilitate certain compute topologies. The compute topologies can facilitate communication between inverters 262 and certain coordinated performance and/or operation of inverters 262 and/or motors 258, which can lead to further reductions in the size of the DC capacitor(s) associated with inverters 262, thereby realizing further weight savings. Further, the compute topologies can provide additional redundancies to ensure continued operation in the event of a fault and/or failure condition experienced by a controller. In the exemplary implementation illustrated in FIG. 2B, the compute topology can include inverter controllers 263, which may be configured to communicate with each other via a ring communication bus configuration to coordinate operation of inverters 262 and/or motors 258. Further, inverter controllers 263 may be configured to communicate, via CAN bus 256, with avionics systems 255. Exemplary implementations of a compute topology that may be employed by power electronics system 250 is described in further detail herein in connection with FIG. 3B.

In the illustrated exemplary implementation, each integrated power core 260 may be electrically coupled, via high voltage DC bus 252, to power supplies of an aerial vehicle, such as a UAV. Each integrated power core may include inverters 262, each having one or more associated inverter controllers 263, and DC-to-DC converters 266, which can power low voltage DC bus 254. In operation, inverter controllers 263 may communicate with each other via a ring communication bus configuration, as well as avionics systems 255 (e.g., via CAN bus 256), and inverters 262 may be electrically coupled to motors 258, which may be associated with propulsion mechanisms (e.g., propulsion mechanisms 102) of the aerial vehicle, to drive and/or control motors 258 and/or the propulsion mechanisms. Additionally, inverter controllers 263 may be configured to activate certain protection mechanisms in the event of fault and/or failure conditions.

Figure 3A:
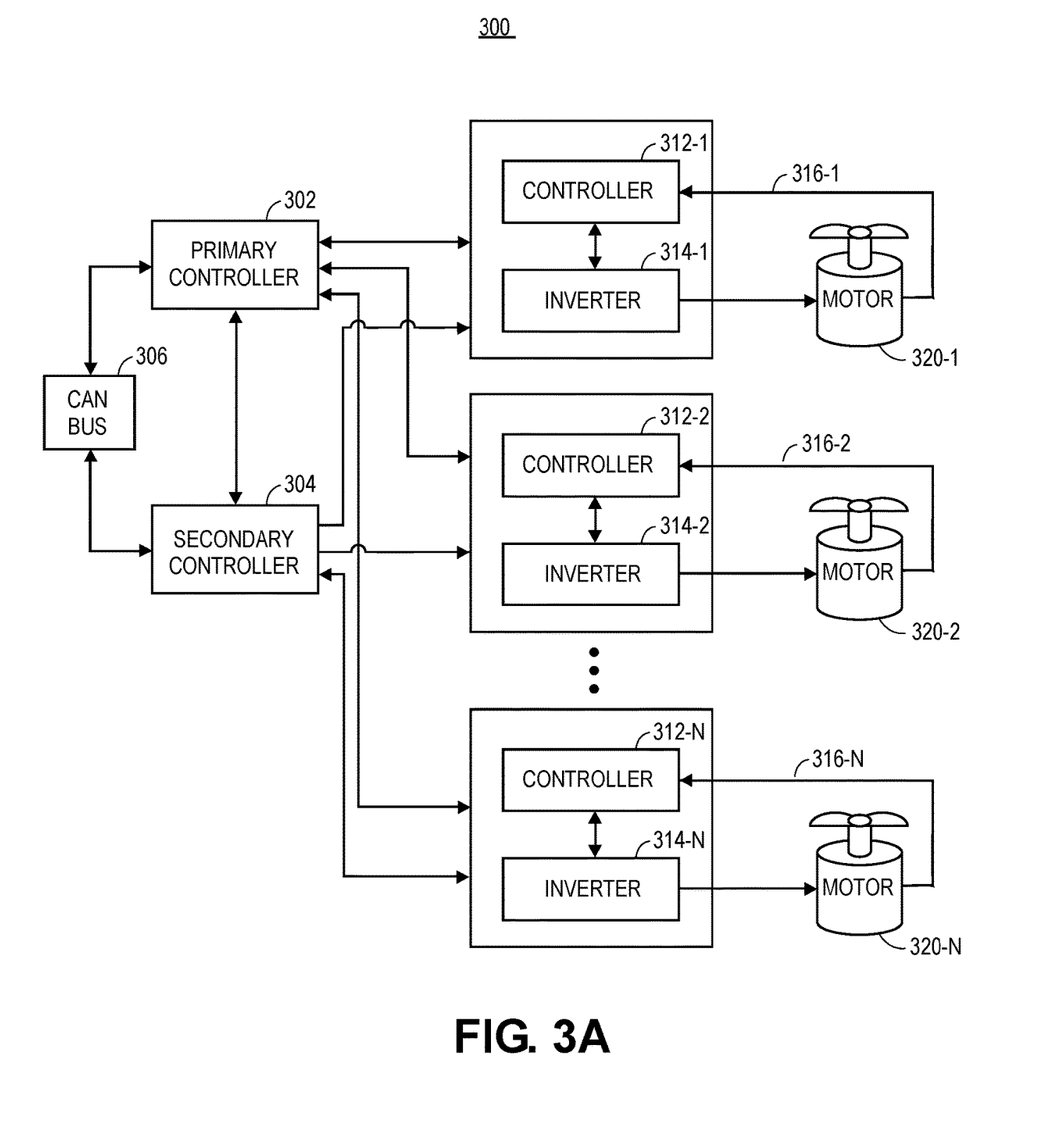
FIG. 3A is a block diagram illustrating an exemplary compute topology, according to exemplary embodiments of the present disclosure.

FIG. 3A is a diagram illustrating an exemplary compute topology 300, according to exemplary embodiments of the present disclosure. According to exemplary embodiments of the present disclosure, compute topology 300 illustrated in FIG. 3A may be implemented in connection with power electronics system 200 in an aerial vehicle, such as a UAV.

As shown in FIG. 3A, compute topology 300 can include primary controller 302, secondary controller 304, and inverter controllers 312. Primary controller 302 and secondary controller 304 can communicate with each inverter controller 312, as well as other systems and controllers of the UAV, to facilitate management and/or monitoring of inverters 314 and motors 320, as well as coordinated operation of inverters 314 and/or motors 320. Compute topology 300 can be configured to apportion different tasks to inverter controllers 312 and primary controller 302 and secondary controller 304. For example, inverter controllers 312 can be configured to handle real-time type tasks, while primary controller 302 and secondary controller 304 can be configured to handle non-real-time tasks. Further, compute topology 300 can be implemented as part of a single integrated power core (e.g., integrated power core 210), such that primary controller 302, secondary controller 304, and inverter controllers 312 are co-located with each other. Accordingly, compute topology 300 can facilitate communication and/or coordination across all inverters arranged on the common integrated power core and can obviate the need for the controllers associated with the inverters to communicate with other systems and/or controllers via the CAN bus of the UAV. Further, although not shown in FIG. 3A, compute topology 300 may include various isolation devices configured to electrically isolate any of primary controller 302, secondary controller 304, and inverter controllers 312 in the event of certain fault and/or failure conditions.

As shown in FIG. 3A, primary controller 302 and secondary controller 304 can communicate with inverter controllers 312 and other controllers and systems (e.g., avionics systems, etc.) via one or more connections to CAN bus 306. In the illustrated implementation, primary controller 302 and secondary controller 304 may be configured to handle tasks that are not necessarily real-time dependent and can be performed slower than real-time tasks, such as monitoring the performance and/or operation of inverters 314 (and motors 320) and acting as a bridge between inverter controllers 312 (and inverters 314) and other systems and controllers of the UAV. Further, primary controller 302 and secondary controller 304 may be configured to manage communications from other controllers and systems via CAN bus 306. According to an exemplary implementation, primary controller 302 and secondary controller 304 may process, generate, receive, and send data and instructions in connection with flight commands, state management control, coordination between inverters 314, monitor operation and/or function of inverters 314 and motors 320, telemetry information (e.g., speed information, temperature information, other sensor information, etc.) received form inverter controllers 312, and the like.

Primary controller 302 and secondary controller 304 may also be configured to handle certain fault and/or failure conditions that do not require immediate remediation (e.g., >1 second, etc.). Further, primary controller 302 and secondary controller 304 may communicate with each other to verify and/or confirm proper operation of the other. For example, primary controller 302 and secondary controller 304 can perform cross-checks, watchdog type verifications, and the like. In the event that it is determined, via the verification communications, that one of primary controller 302 and secondary controller 304 is experiencing a fault and/or failure condition, the other controller can fully assume the responsibilities of the failing and/or faulty controller. For example, if it is determined that primary controller 302 is faulty and/or failing, secondary controller 304 can assume the role of primary controller 302. Accordingly, compute topology 300 can provide redundancy in the event that one of primary controller 302 and/or secondary controller 304 is faulty and/or fails.

As shown in FIG. 3A, inverter controllers 312 may be positioned and arranged to be co-located and/or proximate with the corresponding inverters 314 and may communicate with primary controller 302 and secondary controller 304 so that inverter controllers 312 do not need to directly communicate with other systems of the UAV via CAN bus 306. Accordingly, inverter controllers 312 may be configured to process and handle, for example, critical, real-time type tasks that may require low latency. For example, inverter controllers 312 may be configured to process and manage motor controls associated with inverters 314 and/or motors 320, fault statuses associated with inverters 314 and/or motors 320, obtaining and/or processing reading telemetry information obtained from motors 320 (e.g., from analog-to-digital converters (A/DC converters) configured to convert analog telemetry information (e.g., speed information, temperature information, or other sensor information) obtained via feedback loop 316 from motors 320, driving the control loop associated with inverters 314 and/or motors 320, an interleaving clock signal, and the like.

In the illustrated implementation, compute topology 300 can facilitate coordinated operation between inverters 314-1, 314-2, through 314-N, as well as motors 320-1, 320-2, through 320-N. For example, primary controller 302 and/or 304 can coordinate interleaved operation and/or load sharing of the DC link capacitors and/or inverters 314-1, 314-2, through 314-N and motors 320-1, 320-2, through 320-N by coordinating offsets to the switching patterns applied to inverters 314-1, 314-2, through 314-N.

As shown in FIG. 3A, compute topology 300 can include primary controller 302, secondary controller 304, and inverter controllers 312. Primary controller 302 and secondary controller 304 can communicate with other systems and controllers of the UAV and each inverter controller 312 to facilitate management and/or monitoring of inverters 314 and coordinated operation of inverters 314 and/or motors 320. Compute topology 300 can be configured to apportion different tasks to inverter controllers 312 and primary controller 302 and secondary controller 304. For example, inverter controllers 312 can be configured to handle real-time type tasks, while primary controller 302 and secondary controller 304 are configured to act as a bridge between inverter controllers 312, as well as monitor and manage operation of inverters 314.

Further, compute topology 300 can be implemented as part of a single integrated power core (e.g., integrated power core 210), such that primary controller 302, secondary controller 304, and inverter controllers 312 are co-located with each other. Accordingly, compute topology 300 can facilitate communication and/or coordination across all inverters arranged on the common integrated power core and can obviate the need for the controllers associated with the inverters to communicate with other systems and/or controllers via the CAN bus of the UAV.

Figure 3B:
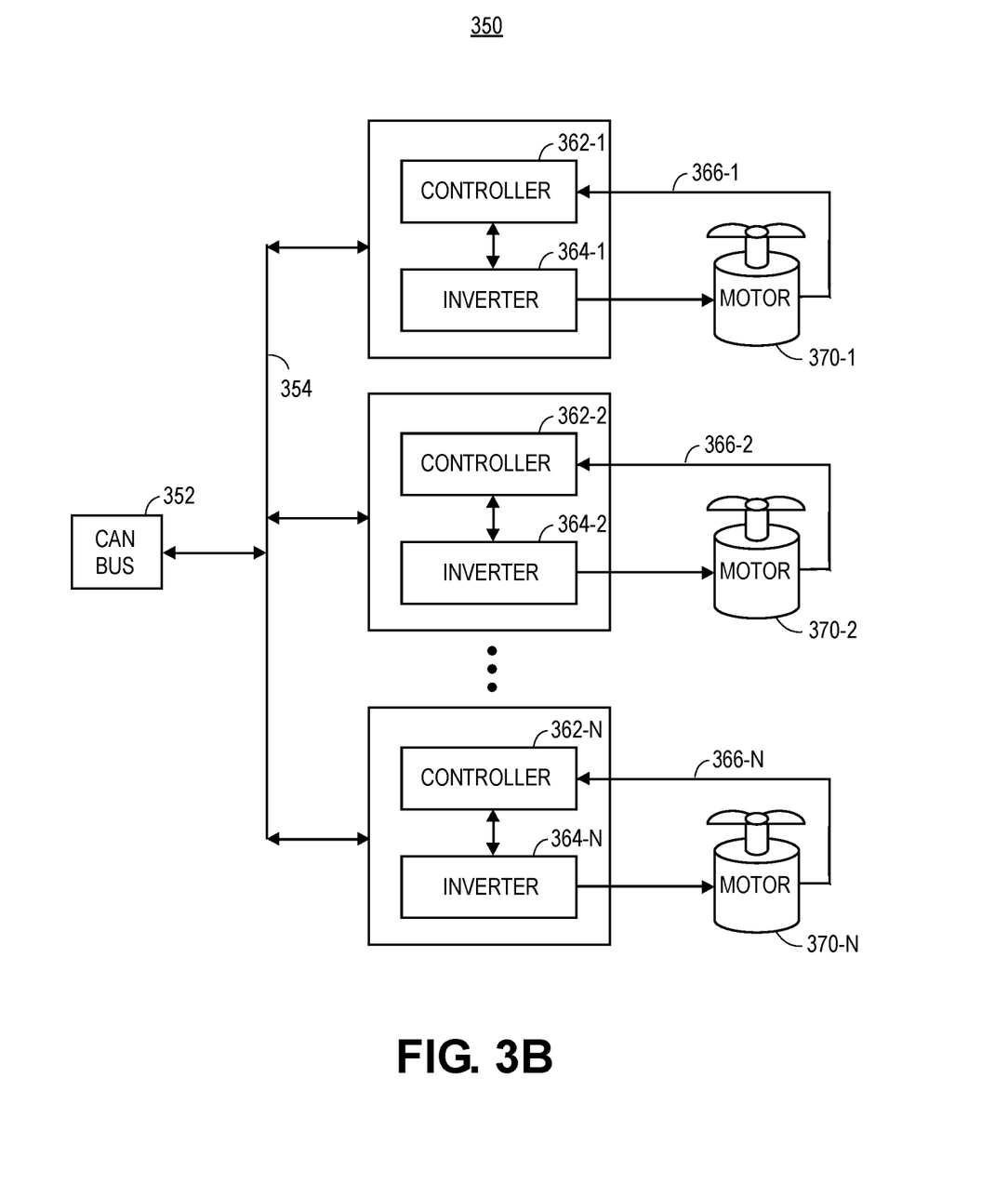
FIG. 3B is a block diagram illustrating an exemplary compute topology, according to exemplary embodiments of the present disclosure.

FIG. 3B is a block diagram illustrating an exemplary compute topology 350, according to exemplary embodiments of the present disclosure. Compute topology 350 illustrated in FIG. 3B may be implemented in connection with power electronics system 250 in an aerial vehicle, such as a UAV.

Compute topology 350 may be an exemplary compute topology that may be implemented in an integrated power core to facilitate communication and/or coordination across all inverters arranged on the common integrated power core that may operate similarly to compute topology 300 shown in FIG. 3A. As shown in FIG. 3B, compute topology 350 can include inverter controllers 362 co-located on a common integrated power core (e.g., integrated power core 260) and configured to communicate with each other and CAN bust 352 via communication bus 354. Accordingly, as shown in FIG. 3B, inverter controllers 362 may be positioned and arranged to be co-located and/or proximate with the corresponding inverters 364 and may communicate with other inverter controllers 362 via communication bus 354, such that inverter controllers 362 can facilitate communication and/or coordination across all inverters 364 arranged on the common integrated power core. Further, similar to compute topology 300, inverter controllers 362 of compute topology 350 may operate similarly to inverter controllers 312 of compute topology 300. Accordingly, inverter controllers 362 may be configured to process and handle, for example, critical, real-time type tasks that may require low latency. For example, inverter controllers 362 may be configured to process and manage motor controls associated with inverters 364 and/or motors 370, fault statuses associated with inverters 364 and/or motors 370, obtaining and/or processing reading telemetry information obtained from motors 370 (e.g., from analog-to-digital converters (A/DC converters) configured to convert analog telemetry information (e.g., speed information, temperature information, or other sensor information) obtained via feedback loop 366 from motors 370, driving the control loop associated with inverters 364 and/or motors 370, an interleaving clock signal, and the like. Further, although not shown in FIG. 3B, compute topology 350 may include various isolation devices configured to electrically isolate any of inverter controllers 362 in the event of certain fault and/or failure conditions.

Although compute topology 350 may be similar to compute topology 300, when compared to compute topology 300, compute topology 350 excludes primary controller 302 and secondary controller 304. Accordingly, in compute topology 350, the functions performed by primary controller 302 and secondary controller 304 may also be performed by inverter controllers 362 and communication bus 354. For example, inverter controllers 362 may process, generate, receive, and send data and instructions in connection with flight commands, state management control, coordination between inverters 364, monitor operation and/or function of inverters 364 and motors 370, fault and/or failure management, management of protection mechanisms, and the like. According to exemplary embodiments of the present disclosure, the operations performed by inverter controllers 362 may be implemented as a combination of one or more of hardware, software, firmware, controllers, and the like.

In operation, each inverter controller 362 may communicate with each other via communication bus 354. For example, inverter controller 362-1 associated with inverter 364-1 may generate a message (e.g., regarding its status, a fault and/or failure condition, interleaving and/or load sharing operation, and the like). The message may be transmitted and/or broadcast, via communication bus 354, to at least one of inverter controllers 362-2 and/or 362-N, which are associated with inverters 364-2 and 364-N. Inverter controllers 362-2 and/or 362-N may process the message sent by inverter controller 362-2 and may optionally generate a message to add to the message sent by inverter controller 362-1. The message may then be sent and/or broadcast, via communication bus 354, to at least one of inverter controllers 362-1, 362-2, and/or 362-N. Similarly, inverter controllers 362-1, 362-2, and/or 362-N may process the message sent by inverter controller(s) 362-1, 362-2, and/or 362-N and may optionally generate a message to add to the message. This message may then be sent and/or broadcast, via communication bus 354, to at least one of inverter controllers 362-1, 362-2, and/or 362-N, and the process may continue. In one exemplary implementation, communication bus 354 may include a ring communication bus topology.

The messages sent between inverter controllers 362 via communication bus 354 can facilitate coordinated operation between inverters 364-1, 364-2, through 364-N, as well as motors 370-1, 370-2, through 370-N. For example, the messages sent between and among inverter controllers 362 can facilitate coordinated interleaved operation and/or load sharing of the DC link capacitors and/or inverters 364-1, 364-2, through 364-N and motors 370-1, 370-2, through 370-N by circulating commands for driving inverters 364 and/or motors 370, etc. Accordingly, based on the messages exchanged between each inverter controller 362, compute topology 350 can facilitate communication and/or coordination across all inverters 364 (and/or motors 370) arranged on the common integrated power core.

Figure 4:
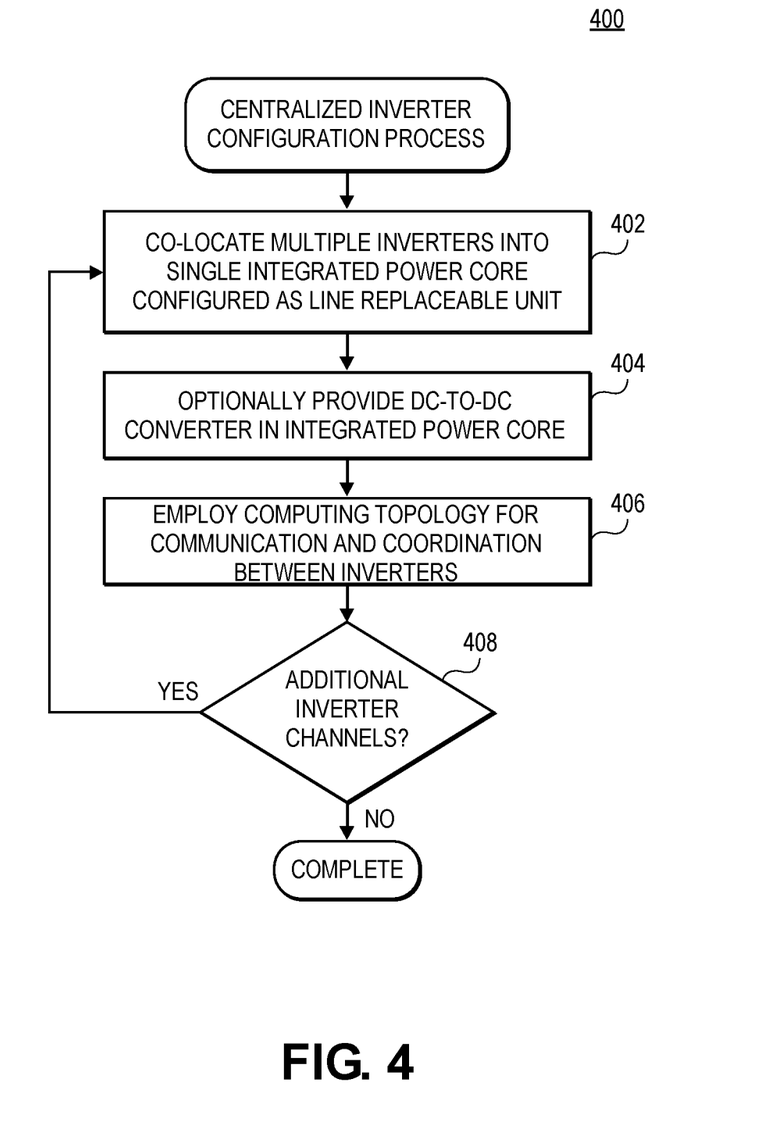
FIG. 4 is a flow diagram of an exemplary centralized inverter configuration process, according to exemplary embodiments of the present disclosure.

FIG. 4 is a flow diagram of an exemplary centralized inverter configuration process 400, according to exemplary embodiments of the present disclosure.

As shown in FIG. 4, exemplary centralized inverter configuration process 400 may begin with co-locating multiple inverters into a single integrated power core as a single line replaceable unit (LRU), as in step 402. For example, multiple inverters may be centrally co-located on a single integrated power core (e.g., integrated power core 210) of an aerial vehicle (e.g., aerial vehicle 100), such as a UAV. In one exemplary implementation, each integrated power core may include three inverters and a UAV may include two integrated power cores. However, according to aspects of the present disclosure, any number of inverters may be implemented on an integrated power core and/or any number of integrated power cores may be implemented in a particular application. Further, each integrated power core unit may be configured as a single line replaceable unit (LRU) to facilitate efficient repair, maintenance, and/or replacement of each integrated power core.

As described herein, each integrated power core may be electrically coupled to a power supply via a high voltage DC bus, and the inverters may be configured to drive and control one or more electric motors. In the exemplary implementation where the integrated power cores are implemented in an aerial vehicle, the electric motors may be associated with propulsion mechanisms.

In step 404, a DC-to-DC converter, such as a step-down converter, may be implemented in each integrated power core to power a low voltage DC bus. Accordingly, the integrated power cores can provide power distribution functions to provide suitable voltages to power a low voltage DC bus to power low voltage electrical loads.

Additionally, a computing topology, such as computing topology 300 and/or computing topology 350, may be employed, as in step 406. For example, a centralized computing topology including centralized controllers and inverter controllers may be implemented on each integrated power core to facilitate communication between the inverters and/or facilitate coordinated operation of the inverters. Alternatively and/or in addition, a computing topology having inverter controllers and a ring communication bus topology may be implemented on each integrated power core to facilitate communication between the inverters and/or facilitate coordinated operation of the inverters.

Next, it may be determined if additional inverter channels are required, as in step 408. If additionally inverter channels are required, process 400 may return to step 402 to co-locate the addition inverters on an additional integrated power core.

Figure 5:
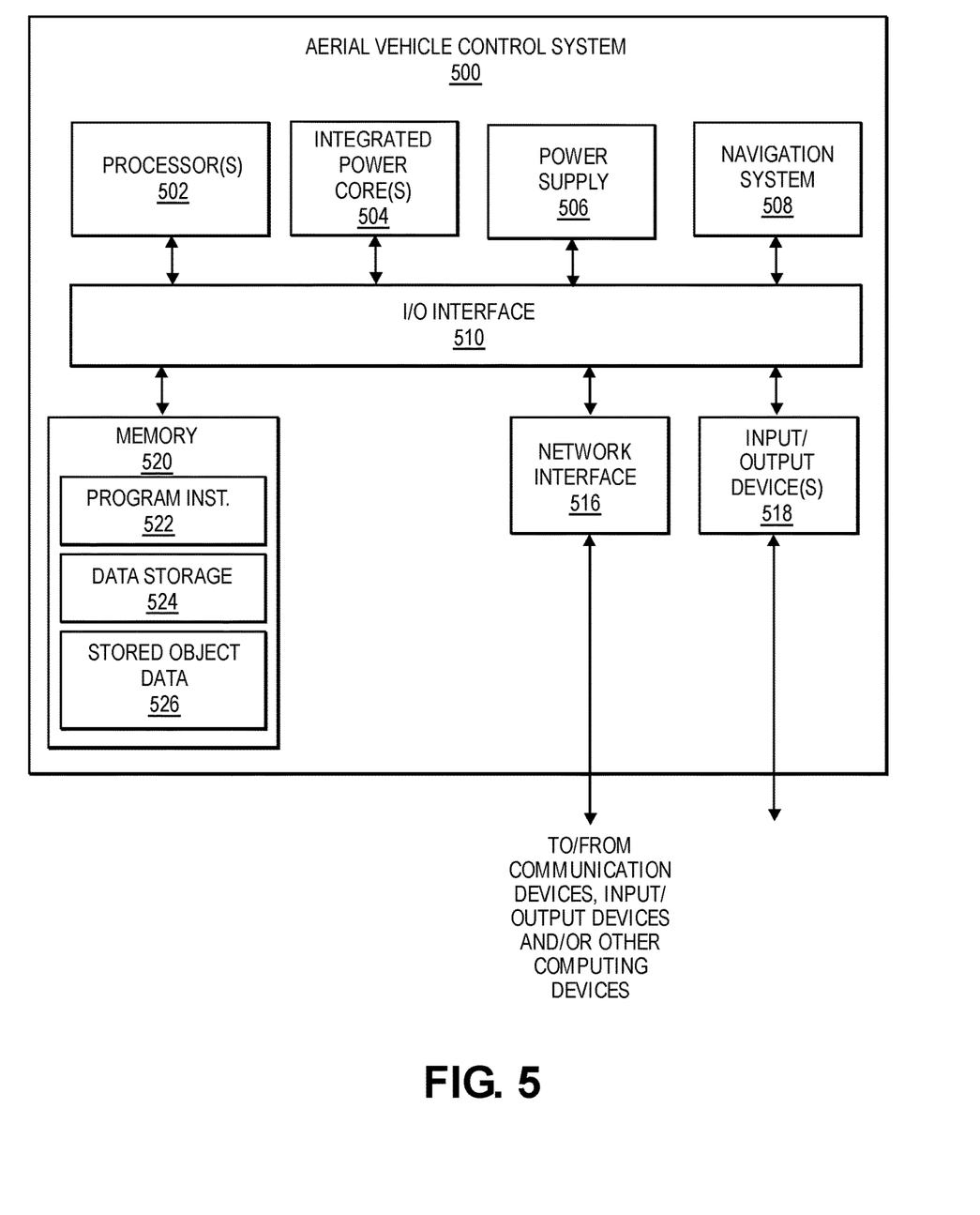
FIG. 5 is a block diagram illustrating various components of an exemplary aerial vehicle control system, according to exemplary embodiments of the present disclosure.

FIG. 5 is a block diagram illustrating various components of an exemplary aerial vehicle control system 500, according to exemplary embodiments of the present disclosure.

In various examples, the block diagram may be illustrative of one or more aspects of the aerial vehicle control system 500 that may be used to implement the various systems and processes discussed above. In the illustrated implementation, the aerial vehicle control system 500 includes one or more processors 502, coupled to a non-transitory computer readable storage medium 520 via an input/output (I/O) interface 510. Aerial vehicle control system 500 may also include integrated power core(s) 504, a power supply or battery 506, and navigation system 508. Aerial vehicle control system 500 may further include network interface 516 and one or more input/output devices 518.

In various implementations, the aerial vehicle control system 500 may be a uniprocessor system including one processor 502, or a multiprocessor system including several processors 502 (e.g., two, four, eight, or another suitable number). The processor(s) 502 may be any suitable processor capable of executing instructions. For example, in various implementations, the processor(s) 502 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 502 may commonly, but not necessarily, implement the same ISA.

The non-transitory computer readable storage medium 520 may be configured to store executable instructions, data, load balancing information, arrangement and/or configuration information relating to the propulsion mechanisms and their associated electronic speed controllers, and/or other data items accessible by the processor(s) 502. In various implementations, the non-transitory computer readable storage medium 520 may be implemented using any suitable memory technology, such as static random-access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 520 as program instructions 522, data storage 524, and stored object data 526, respectively. In other implementations, program instructions and/or stored data may be received, sent or stored upon different types of computer-accessible media, such as non-transitory media, or on similar media separate from the non-transitory computer readable storage medium 520 or the aerial vehicle control system 500.

Generally, a non-transitory, computer readable storage medium may include storage media or memory media such as magnetic or optical media, e.g., disk or CD/DVD-ROM, coupled to the aerial vehicle control system 500 via the I/O interface 510. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 516.

In one implementation, the I/O interface 510 may be configured to coordinate I/O traffic between the processor(s) 502, the non-transitory computer readable storage medium 520, and any peripheral devices, the network interface or other peripheral interfaces, such as input/output devices 518. In some implementations, the I/O interface 510 may perform any necessary protocol, timing or other data transformations to convert data signals from one component (e.g., non-transitory computer readable storage medium 520) into a format suitable for use by another component (e.g., processor(s) 502). In some implementations, the I/O interface 510 may include support for devices attached through various types of peripheral buses, such as a variant of the Peripheral Component Interconnect (PCI) bus standard or the Universal Serial Bus (USB) standard, for example. In some implementations, the function of the I/O interface 510 may be split into two or more separate components, such as a north bridge and a south bridge, for example. Also, in some implementations, some or all of the functionality of the I/O interface 510, such as an interface to the non-transitory computer readable storage medium 520, may be incorporated directly into the processor(s) 502.

Integrated power core(s) 504 may be configured to communicate with processor(s) 502 and/or navigation system 508 and adjusts the operational characteristics of each propulsion mechanism to guide the aerial vehicle along a determined path and/or to perform other navigational maneuvers. Navigation system 508 may include a GPS, IMU, altimeter, speed sensors, or other similar system than can be used to navigate the aerial vehicle to and/or from a location. Further, integrated power core(s) 504 may be configured with one or more controllers forming a compute topology configured to facilitate communication and/or coordinated operation of the inverters/motor drives, as described herein.

The network interface 516 may be configured to allow data to be exchanged between the aerial vehicle control system 500, other devices attached to a network, such as other computer systems, imaging sensors, and/or control systems of other vehicles, systems, machines, equipment, apparatuses, or devices. For example, the network interface 516 may enable wireless communication between numerous aerial vehicles. In various implementations, the network interface 516 may support communication via wireless general data networks, such as a Wi-Fi network. For example, the network interface 516 may support communication via telecommunications networks such as cellular communication networks, satellite networks, and the like.

Input/output devices 518 may, in some implementations, include one or more displays, imaging sensors, image capture devices, thermal sensors, infrared sensors, time of flight sensors, accelerometers, pressure sensors, weather sensors, various other sensors described herein, etc. Multiple input/output devices 518 may be present and controlled by the aerial vehicle control system 500. One or more of these sensors may be utilized to assist in performing the various functions, operations, and processes described herein.

As shown in FIG. 5, the memory may include program instructions 522, which may be configured to implement the example processes and/or sub-processes described above. The data storage 524 may include various data stores for maintaining data items that may be provided for performing the various functions, operations, and processes described herein. For example, the data storage 524 may include stored data object data 526, such as trajectory/flight path/planning, wind data, preferred orientation data, failure condition data, DC current information, DC bus voltage information, motor information, flight operation information, flight transition data, vulnerable orientation data, and/or other data items.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in FIG. 4, orders in which such methods or processes are presented are not intended to be construed as any limitation on the claimed invention, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An aerial vehicle, comprising:
   a plurality of propulsion mechanisms; and
   a power electronics system, including:
      a first integrated power core electrically coupled to a high voltage direct current (DC) bus and having a first plurality of inverters co-located on the first integrated power core and remote from the plurality of propulsion mechanisms;
      a second integrated power core electrically coupled to the high voltage DC bus and having a second plurality of inverters co-located on the second integrated power core and remote from the plurality of propulsion mechanisms;
      at least one step-down DC-to-DC converter configured to down convert a voltage on the high voltage DC bus to power a low voltage DC bus; and
      a compute topology including a plurality of inverter controllers configured to control the first plurality of inverters and the second plurality of inverters and communicate via a communications bus to enable coordinated operation of the first plurality of inverters and the second plurality of inverters.

2. The aerial vehicle of claim 1, wherein the first integrated power core includes a first step-down DC-to-DC converter and the second integrated power core includes a second step-down DC-to-DC converter.

3. The aerial vehicle of claim 1, further comprising:
   a fuselage,
   wherein the first integrated power core and the second integrated power core are disposed in the fuselage.

4. The aerial vehicle of claim 1, wherein each of the first integrated power core and the second integrated power core is configured as a line replaceable unit.

5. The aerial vehicle of claim 1, wherein the communication bus includes a ring configuration connecting the plurality of inverter controllers and configured to enable communication between the plurality of inverter controllers.

6. A power electronics system, comprising:
   a first integrated power core electrically coupled to a power supply via a high-voltage direct current (DC) bus, the first integrated power core including:
      a first plurality of inverters co-located on the first integrated power core and remote from a first plurality of motors driven by the first plurality of inverters;
      a first step-down DC-to-DC converter configured to down convert a voltage on the high-voltage DC bus to power a low-voltage DC bus; and
      a first plurality of inverter controllers configured to enable coordinated operation of the first plurality of inverters.

7. The power electronics system of claim 6, further comprising:
   a second integrated power core electrically coupled to the power supply via the high-voltage DC bus, the second integrated power core including:
      a second plurality of inverters co-located on the second integrated power core and remote from a second plurality of motors driven by the second plurality of inverters;
      a second step-down DC-to-DC converter configured to down convert the voltage on the high-voltage DC bus to power the low-voltage DC bus; and
      a second plurality of inverter controllers configured to enable coordinated operation of the second plurality of inverters.

8. The power electronics system of claim 7, wherein the first plurality of inverters includes three inverters and the second plurality of inverters includes three inverters.

9. The power electronics system of claim 6, wherein the first integrated power core further includes a first central controller in communication with the first plurality of inverter controllers and is configured to enable at least one of interleaved operation of a DC capacitor of the first integrated power core, interleaved operation of the first plurality of inverters, or load sharing between the first plurality of inverters.

10. The power electronics system of claim 9, wherein the first integrated power core further includes a second central controller configured to provide redundancy to the first central controller and is in communication with the first central controller and the first plurality of inverter controllers.

11. The power electronics system of claim 9, wherein the first plurality of inverter controllers are configured to perform real-time tasks associated with at least one of the first plurality of inverters or the first plurality of motors and the first central controller is configured to perform non-real-time tasks associated with at least one of the first plurality of inverters or the first plurality of motors.

12. The power electronics system of claim 6, wherein each of the first plurality of inverters includes a corresponding inverter controller of the first plurality of inverter controllers.

13. The power electronics system of claim 6, wherein the first plurality of inverter controllers are connected by a ring communication bus configured to enable communication between the plurality of inverter controllers to enable at least one of interleaved operation of a DC capacitor of the first integrated power core, interleaved operation of the first plurality of inverters, or load sharing between the first plurality of inverters.

14. The power electronics system of claim 6, wherein the first integrated power core is configured as a line replaceable unit.

15. A power electronics system, comprising:
a first integrated power core electrically coupled to a power supply via a high-voltage direct current (DC) bus, the first integrated power core including:
a first plurality of inverters co-located on the first integrated power core and remote from a first plurality of motors driven by the first plurality of inverters;
a first step-down DC-to-DC converter configured to down convert a voltage on the high-voltage DC bus to power a low-voltage DC bus; and
a first central controller configured to communicate with a first plurality of inverter controllers to enable coordinated operation of the first plurality of inverters; and a second integrated power core electrically coupled to the power supply via the high-voltage DC bus, the second integrated power core including:
a second plurality of inverters co-located on the second integrated power core and remote from a second plurality of motors driven by the second plurality of inverters;
a second step-down DC-to-DC converter configured to down convert the voltage on the high-voltage DC bus to power the low-voltage DC bus; and
a second central controller configured to communicate with a second plurality of inverter controllers to enable coordinated operation of the second plurality of inverters.

16. The power electronics system of claim 15, wherein:
the first integrated power core includes a third central controller configured to provide redundancy to the first central controller and is in communication with the first central controller and the first plurality of inverter controllers; and
the second integrated power core includes a fourth central controller configured to provide redundancy to the second central controller and is in communication with the second central controller and the second plurality of inverter controllers.

17. The power electronics system of claim 15, wherein the coordinated operation of the first plurality of inverters includes at least one of interleaved operation of a DC capacitor of the first integrated power core, interleaved operation of the first plurality of inverters, or load sharing between the first plurality of inverters.

18. The power electronics system of claim 15, wherein the first central controller and the second central controller includes a controller area network (CAN) bus connection to communicate with controllers disposed outside of the power electronics system and the first plurality of inverter controllers and the second plurality of inverter controllers do not include a CAN bus connection.

19. The power electronics system of claim 15, wherein:
the first plurality of inverter controllers and the second plurality of inverter controllers are configured to perform real-time tasks associated with the first plurality of inverters and the second plurality of inverters; and
the first central controller and the second central controller are configured to perform non-real-time tasks associated with the first plurality of inverters and the second plurality of inverters.

20. The power electronics system of claim 15, wherein each of the first integrated power core and the second integrated power core is configured as a line replaceable unit.

* * * * *